US012383877B2

(12) United States Patent
Vanderputten et al.

(10) Patent No.: US 12,383,877 B2
(45) Date of Patent: Aug. 12, 2025

(54) SYSTEM AND METHOD FOR CONTINUOUS PROCESSING OF POWDER PRODUCTS

(71) Applicant: Fette Compacting GmbH, Schwarzenbek (DE)

(72) Inventors: Joris Vanderputten, Buizingen (BE); Jozef Verheyen, Mortsel (BE); Kris Schoeters, Kessel-Lo (BE); Nicolas Walter, Hamburg (DE); Sven Kolbe, Büchen (DE)

(73) Assignee: Fette Compacting GmbH, Schwarzenbek (DE)

( * ) Notice: Subject to any disclaimer, the term of this patent is extended or adjusted under 35 U.S.C. 154(b) by 715 days.

(21) Appl. No.: 17/622,383

(22) PCT Filed: Jun. 26, 2020

(86) PCT No.: PCT/EP2020/068048
§ 371 (c)(1),
(2) Date: Dec. 23, 2021

(87) PCT Pub. No.: WO2020/260600
PCT Pub. Date: Dec. 30, 2020

(65) Prior Publication Data

US 2022/0258114 A1 Aug. 18, 2022

(30) Foreign Application Priority Data

Jun. 26, 2019 (EP) .................................... 19182700

(51) Int. Cl.
*B01F 33/80* (2022.01)
*A61J 3/02* (2006.01)
(Continued)

(52) U.S. Cl.
CPC .......... *B01F 33/8052* (2022.01); *B01F 23/60* (2022.01); *B01F 33/8051* (2022.01);
(Continued)

(58) Field of Classification Search
CPC .......................... B01F 101/22; B01F 33/8052; B01F 35/2211; B01F 35/714; B01F 35/71731;
(Continued)

(56) References Cited

U.S. PATENT DOCUMENTS 5,071,289 A * 12/1991 Spivak .................. B65G 53/22 406/14
5,149,229 A * 9/1992 Gericke ............... B65G 53/525 406/75
(Continued)

FOREIGN PATENT DOCUMENTS

CN 108472875 A 8/2018
EP 0275834 A1 7/1988
(Continued)

OTHER PUBLICATIONS

Pelletron (Pelletron Cooperation—Pneumatic Conveying Solutions, Published Apr. 2, 2016 https://pelletroncorp.com/en/conveying-technologies.html, Retrieved on Nov. 7, 2024), (Year: 2024).*
(Continued)

*Primary Examiner* — Seyed Masoud Malekzadeh
(74) *Attorney, Agent, or Firm* — Barclay Damon LLP

(57) ABSTRACT

A system for continuous processing of powder products includes a first inlet configured to input a first dry powder product, a second inlet configured to input a second dry powder product, and a dry powder mixing device that mixes the first dry powder product together with the second dry powder product to form a product mixture. An outlet dispenses the product mixture from the dry powder mixing device. A production machine is included and has a powder feed frame comprising a feed frame inlet connected to the outlet of the dry powder mixing device. The outlet of the dry powder mixing device is positioned at a lower level than the feed frame inlet. A product conveying device is connected between the outlet of the dry powder mixing device and the
(Continued)

feed frame inlet to continuously convey the product mixture from the dry powder mixing device to the feed frame inlet.

16 Claims, 5 Drawing Sheets

(51) Int. Cl.

| | |
|---|---|
| ***A61J 3/07*** | (2006.01) |
| ***A61J 3/10*** | (2006.01) |
| ***B01F 23/60*** | (2022.01) |
| ***B01F 101/22*** | (2022.01) |
| ***B30B 15/30*** | (2006.01) |

(52) U.S. Cl.
CPC .. *A61J 3/02* (2013.01); *A61J 3/07* (2013.01); *A61J 3/10* (2013.01); *B01F 2101/22* (2022.01); *B30B 15/308* (2013.01)

(58) Field of Classification Search
CPC .. B01F 23/60; B01F 33/8051; B01F 2101/22; B65G 53/58; B65G 53/525; B65G 53/526; B65G 53/66; B22F 12/52; B22F 12/55; B33Y 30/00; B33Y 40/00
See application file for complete search history.

(56) References Cited

U.S. PATENT DOCUMENTS

| | | | | |
|---|---|---|---|---|
| 5,354,152 | A * | 10/1994 | Reinhardt | B65G 53/60 406/182 |
| 2003/0032675 | A1* | 2/2003 | Franz | A61K 31/195 514/567 |
| 2003/0185635 | A1* | 10/2003 | Van Dorst | B65G 53/66 406/10 |
| 2004/0096495 | A1 | 5/2004 | Watanabe et al. | |
| 2005/0000581 | A1* | 1/2005 | Lane | B65G 53/58 137/808 |
| 2005/0178325 | A1* | 8/2005 | Herre | B05B 7/1459 118/308 |
| 2007/0092380 | A1* | 4/2007 | Fulkerson | B65G 53/28 417/65 |
| 2012/0006624 | A1* | 1/2012 | Russell | B65G 45/02 184/15.2 |
| 2016/0121285 | A1* | 5/2016 | Pham | B01F 27/81 366/168.1 |
| 2016/0243781 | A1* | 8/2016 | Vandenbroucke | B30B 11/08 |
| 2016/0310365 | A1* | 10/2016 | Boeckx | B29B 13/065 |
| 2019/0210817 | A1* | 7/2019 | Ellis | B65G 53/521 |

FOREIGN PATENT DOCUMENTS

| | | | |
|---|---|---|---|
| EP | 1700686 | A2 | 9/2006 |
| EP | 2427166 | | 11/2010 |
| EP | 3013571 | A1 | 5/2016 |
| JP | 2007-007733 | A | 1/2007 |
| JP | 2012-525895 | A | 10/2012 |
| JP | 2015-536197 | A | 12/2015 |
| WO | 2009/135948 | A2 | 11/2009 |
| WO | 2010/128359 | A1 | 11/2010 |
| WO | 2014/207510 | A1 | 12/2014 |

OTHER PUBLICATIONS

Japanese Patent Office, Office Action from Japanese Patent Appl. No. JP2021-577050, mailed Sep. 12, 2023 with English translation (total 8 pgs.).
PCT/EP2020/068048; filed Jun. 26, 2020; International Search Report and Written Opinion; date of mailing Sep. 30, 2020 (15 pages).
CN 202080046382; filed Jun. 26, 2020; Chinese Office Action; dated Apr. 1, 2024 (8 pages).
CN 202080046382; filed Jun. 26, 2020; English translation of Chinese Office Action; dated Apr. 1, 2024 (7 pages).
Japanese Patent Office; Decision of Refusal; Application No. 2021-577050; Dated: Oct. 9, 2024; 6 pages.
Japanese Patent Office; Decision of Refusal; Application No. 2021-577050; Dated: Oct. 9, 2024; 6 pages English Translation.

* cited by examiner

SYSTEM AND METHOD FOR CONTINUOUS PROCESSING OF POWDER PRODUCTS

CROSS REFERENCE TO RELATED INVENTION

This application is a national stage application pursuant to 35 U.S.C. § 371 of International Application No. PCT/EP2020/068048, filed on Jun. 26, 2020, which claims priority to, and benefit of, European Patent Application No. 19182700.5, filed Jun. 26, 2019, the entire contents of which are hereby incorporated by reference.

TECHNOLOGICAL FIELD

The disclosure pertains to a system for continuous processing of powder products, comprising a first inlet for a first dry powder product, a second inlet for a second dry powder product, and a dry powder mixing device for continuously providing a product mixture from the first and second dry powder product, wherein the dry powder mixing device comprises an inlet, being connected with the first inlet for the first dry powder product and the second inlet for the second dry powder product, and an outlet for the product mixture, further comprising a production machine, wherein the production machine comprises a powder feed frame with a feed frame inlet, being connected with the outlet of the dry powder mixing device, and an outlet.

The disclosure further pertains to a method for continuous processing of powder products, comprising the steps of continuously providing a first dry powder product and a second dry powder product to a dry powder mixing device, continuously providing a product mixture from the first and second dry powder product with the dry powder mixing device, continuously providing the product mixture to a production machine, continuously processing the product mixture with the production machine and discharging processed product from the production machine.

BACKGROUND

Solid dosage forms or oral solid dosages (OSD), such as tablets or capsules, can be produced for example in tablet presses, for example rotary tablet presses, or capsule filling machines. In continuous production lines a powder mixture of for example at least one active pharmaceutical ingredient (API) and at least one excipient is continuously provided by a mixing device and fed for example to the tablet press or the capsule filling machine. The powder products to be mixed in the mixing device can be provided continuously at inlets of the continuous production line. Feeding and dosing devices can be provided for feeding and dosing the ingredients to be processed. Such a production process is also referred to as a direct processing or, in particular with regard to tablet presses, direct compression process, in contrast to a granulation process where additional devices and process steps are employed, such as dry or wet granulators, and potentially dryers, to improve the processability, such as flowability or compressibility, of a product not suited for direct processing or to avoid segregation of the product mixture.

A system and method for continuous production of solid dosage forms are known for example from EP 3 013 571 A1. The components of the system, in particular the feeding and dosing devices, the mixing device, and the tablet press, are stacked vertically so that the product(s) flow(s) from the feeding and dosing devices to the mixing device and to the tablet press via gravity. This makes product flow in the system reliable, simple and cost-efficient. However, the current inventors have found that this system design, which is common throughout the current field of continuous production of solid dosage forms, has certain disadvantages. One disadvantage is the considerable height of the overall system of up to 5 m and more. In practice systems can exceed a height of 7 m. This requires specific production rooms providing the necessary room height, making it difficult to use standard production rooms for tablet compression or capsule filling. Also, for operator personnel being able to access system components, such as the feeding and dosing devices or the mixing device, the installation of specific operator platforms is necessary, making the system design more complicated and costly as well as complex to access and clean and having a large overall footprint, due to use of stairs and platforms for operator access.

Alternatively, to operator platforms, lifting systems combined with automatic coupling and decoupling systems could be used to allow for operator access to the system components. Such lifting and automatic coupling systems also make system design and use complicated and costly.

EP 2 427 166 B1 discloses in one embodiment a contained module for production of tablets comprising a granulating device which is installed on a post hoist to allow manual powder loading, cleaning, inspection, maintenance, and set-up at a lower vertical position and to be hoisted above a subsequently arranged dryer for a gravitational feed from the granulating device into the dryer. Alternatively, a pneumatic conveying device may be provided for conveying material from the granulating device to the dryer, and possibly from the dryer to a subsequently arranged tablet press. This module according to EP 2 427 166 B1 is thus not a direct compression module, but rather contains a granulating device.

In direct processing systems a considerable problem lies in a possible segregation of the product mixture after mixing. For instance, a single ingredient can segregate from the mixture because the ingredient's particles are not bonded with the other ingredient's particles by a granulation process. This can cause a non-homogenous mixture with a too high or too low concentration of this ingredient in the product mixture. This, in turn, can lead to quality issues in the produced solid dosages. Therefore, it has been preferred to directly feed powder product from the mixing device to the production machine, such as a tablet press, via gravity, leading to the above discussed drawbacks inter alia regarding system height. In non-direct processing systems with granulating devices, such as the module described in EP 2 427 166 B1, this problem of segregation is not of particular relevance, in particular due to the bonding between the different ingredient's particles through the granulation process.

Based on the prior art discussed above, it is an object of the present invention to provide a system and method for continuous processing of powder products which can be constructed, installed and utilized in a simple and cost-efficient manner.

BRIEF SUMMARY OF THE INVENTION

For a system of the above discussed type, an embodiment of the disclosed invention solves the object in that the outlet of the dry powder mixing device is positioned at a lower level than the feed frame inlet of the production machine, and in that a product conveying device is positioned in the connection between the outlet of the dry powder mixing device and the feed frame inlet of the production machine, said product conveying device continuously conveying the product mixture from the outlet of the dry powder mixing device to the feed frame inlet of the production machine.

For a method of the above discussed type, the disclosed invention solves the object in that the product mixture provided by the dry powder mixing device is provided at an outlet of the dry powder mixing device which is arranged at a lower level than a feed frame inlet of the production machine for the product mixture, and in that the product mixture is conveyed from the outlet of the dry powder mixing device to the feed frame inlet of the production machine with a product conveying device arranged in the connection between the outlet of the dry powder mixing device and the feed frame inlet of the production machine.

With the inventive system, for example solid dosage forms may be produced. The solid dosage forms which may be produced with the inventive system and method are in particular oral solid dosages (OSD). They can be produced from dry powder materials fed to the inventive system through the first and second inlet. As explained above, the invention may pertain to a direct processing system and method. In particular in systems including a tablet press this is also referred to as a direct compression system and method. In the inventive system and method, preferably direct processing system and method, a first dry powder product, such as an active pharmaceutical ingredient (API) is continuously blended with a second dry powder product, for example an excipient, in a mixing device. The mixing device is a dry powder mixing device. The product mixture produced in the dry powder mixing device is thus a dry powder product mixture. In particular, the dry powder product mixture may be a non-bonded dry powder product mixture. The mixing device is not a granulation device, in particular neither with a chemical nor mechanical granulation process. Directly following the blending step, solid dosage forms may be continuously produced in a production machine, for example tablets by compression of the powder products in a tablet press. No additional devices or steps are necessary, like granulation devices or drying devices or steps or the like. The inventive system and method in particular does not need to contain a granulation device or process, or a drying device or process.

The inventive system and method are for continuous processing of powder products. They are accordingly a continuous system and a continuous method. This includes the possibility of intermittent process components or process steps included in the inventive system and method.

The mixing device can be any type of continuously operating dry powder mixing or blending device, where infeed and outfeed are preferably continuous product streams. The mixing device could for example be a screw blender. The mixing device can comprise a mixing tube. The mixing tube can for example be arranged substantially horizontally. The inlet or the inlets of the mixing device can be provided at the upper side of the mixing tube. The outlet can be arranged at the lower side of the mixing tube.

As indicated, the first product may for example be an API. The second product may for example be an excipient. Of course, more than the first and second powder products can be fed to and processed in the inventive system and method, for example one or more further APIs or one or more further excipients, such as one or more lubricants. To this end the inventive system can comprise more inlets for further powder products to be mixed and processed. The mixing device may have a joint inlet for the first and second powder product. However, the inlet of the mixing device connected with the first and second inlet for the first and second powder product could also comprise two separate inlets, one connected with the first inlet for the first powder product and one connected with the second inlet for the second powder product. Also, the mixing device may comprise further inlets for further powder products, for example a further excipient, such as a lubricant. The mixing device could for example comprise a first common inlet for an API and a first excipient, and a second inlet for a further excipient, such as a lubricant. For example, if a common inlet for the powder products from the first and second inlets is provided, a hopper may be provided between the first and second inlets and the inlet of the mixing device collecting and feeding to the mixing device the materials to be mixed.

In an embodiment, connections between the components of the inventive system can be provided in the form of pipes or the like. The inlets and outlets of the system and its components may be designed detachable, such that they can be detached from a respective connection. However, they may also be non-detachable such that they are fixedly connected with the respective connection they are fitted to, for example integrated with the respective connection. The inlets and outlets of the system and its components may have closure devices for closing off the respective connection they are fitted to. However, they may also be provided without such closure devices such that access to the respective connection may be always open.

In an embodiment, the outlet of the mixing device is positioned at a lower height than the powder feed frame inlet of the production machine. The powder feed frame denotes the part of the production machine where the powder material to be processed in the production machine is entering the production machine and/or being collected before processing. For example, in tablet presses the feed frame usually comprises a filler housing, in which for example rotating paddles are arranged which keep the powder in flowing condition such that the powder can be filled into dies of a rotor of the tablet press. For example, in capsule filling machines the feed frame usually also comprises a filler housing, in which powder is collected before being filled into capsules, in particular before being fed to a tamping station for slight compaction of the powder before filling into capsules. The feed frame inlet may for example be arranged inside a housing of the production machine and for example above the feed frame of a tablet press or the tamping station of a capsule filling machine. Due to the inventive design the product mixture provided at the outlet of the mixing device must be lifted to the higher feed frame inlet of the production machine. For this purpose, a product conveying device is provided which conveys the powder product mixture from the outlet of the mixing device, being arranged at the lower height, to the feed frame inlet of the production machine, being arranged at the greater height. The powder product conveying device thus lifts the powder product mixture from a lower vertical level to a higher vertical level. The product conveying device may have an inlet at a lower level, connected with the outlet of the mixing device, and an outlet at a higher level, connected with the feed frame inlet of the production machine. The inlet and outlet of the product conveying device may be arranged such that the powder mixture may flow via gravity from the outlet of the mixing unit to the inlet of the product conveying device and, once having been conveyed to the higher level, may flow via gravity from the outlet of the product conveying device to the feed frame inlet of the production machine.

It has been found that with the disclosed system and method, a reliable transport of the powder product mixture and a reliable production of for example solid dosage forms from the powder mixture in the production machine meeting all quality requirements is possible also in continuous direct processing systems and methods. In particular, it has been found that with the inventive design with a powder product conveying device, segregation of the product mixture can be avoided to the necessary extent. Based on this finding, it is possible to position the mixing device, as well as the first inlet and second inlet, beside the production machine, instead of above the production machine, also in direct processing systems. The production machine and the mixing device, as well as the first and second inlet, and potentially any further components of the system, can be installed on the same floor level, in particular within a considerably reduced height compared with prior art systems. The disclosed system and method therefore allow a simple and cost-efficient installation in standard production rooms already existing without the necessity of large modifications or even building new production rooms, also for direct processing systems. No operator platform for accessing certain components of the system is necessary. Also, no lifting devices for lifting components of the system up and down or automatic coupling and decoupling devices are necessary. The inventive system may accordingly be provided without any such lifting device or automatic coupling and decoupling devices or any operator platform for accessing components of the inventive system, for example for set-up, disassembly, cleaning, maintenance or repair. Rather, the system generally provides for better accessibility and ergonomics for setup, inspection, cleaning, disassembling, maintenance or repair as well as product changeover. Additionally, the elimination of operator platforms reduces the footprint of the production line. The inventive system is more compact, easier and faster to install and to start up. At the same time all advantages of a continuous direct processing system and method can be realized. A compact unit, such as the inventive system, can also be made mobile, allowing it to be moved from one production room to another. The inventive powder conveying device allows for example the mixing device as well as potential feeding and dosing devices to be remotely set up from the production machine in the same room or in adjacent rooms. Integration of powder diverter mechanisms between the mixing device and production machine to reject out of specification material, becomes easier. Of course, the inventive system is also more cost-efficient than multiple level complex systems of the prior art.

The inventive system may be a contained system, for example with a containment level for product toxicity level OEB3 or higher (measured for example according to the SMEPAC test (Standardized Measurement of Equipment Particulate Airborne Concentration).

According to an embodiment, the continuous processing of powder products may be a continuous production of solid dosage forms in direct processing, wherein the production machine is provided for continuously producing solid dosage forms from the product mixture, and has an outlet for discharging produced solid dosage forms. The production machine can thus discharge solid dosage forms as a processed product. The product discharged according to the disclosed method may accordingly be solid dosage forms. The production machine may be a tablet press or a capsule filling machine. The solid dosage forms may accordingly be tablets or capsules. The tablet press may in particular be a rotary tablet press.

The production machine may also be a different production machine, such as a granulating device. The granulating device is fed with the dry powder product mixture from the dry powder mixing device, with the purpose of bonding the single ingredients together. The granulating device may be a dry or wet granulating device. In a dry granulation devices bonds are formed by compaction. In a wet granulation device bonds are formed by using a binding agent, such as water or a solvent. The dry granulating device may for example be a roller compactor. In any case, the inventive powder product conveying device conveys the dry powder product mixture.

The inventive system may also comprise more than one production machines and/or more than one dry powder mixing devices wherein more than one inventive product conveying devices may be provided between each of the dry powder mixing devices and the respective production machine downstream of the respective dry powder mixing device.

According to a further embodiment, the first inlet for the first powder product and the second inlet for the second powder product may be arranged at a level not higher than the production machine or the product conveying device. The first and second inlet may in particular be positioned such that they do not extend to a level above the production machine or the product conveying device. The product conveying device, or its outlet for discharging conveyed product mixture to the feed frame inlet of the production machine, may extend higher than the feed frame inlet of the production machine. In this case the first and second inlets may be provided not higher than the product conveying device or its outlet. When further inlets for further powder products are provided, then this embodiment can apply to them as well. The above embodiment leads to a further reduction in height.

According to a further embodiment, a feeding and dosing device may be connected with each of the first and second inlets for the first and second powder product, and with the inlet of the mixing device. The feeding and dosing devices may for example be loss-in-weight feeders. The feeding and dosing devices can be arranged in the respective connection between the first and second inlets and the inlet of the mixing device.

According to a further embodiment, the feeding and dosing devices may be arranged in one, two, or more than two rows, in particular along one, two, or more than two horizontal axes. If more than one row of feeding and dosing devices is provided the rows may be arranged for example along parallel horizontal axes. This arrangement contributes further to a compact design, unlike arrangements along a circle, which have been suggested in the prior art.

According to a further embodiment, the feeding and dosing devices may be arranged at a level not higher than the production machine or the product conveying device. The feeding and dosing devices may in particular be positioned such that they do not extend to a level above the production machine or the product conveying device. The feeding and dosing devices may also be arranged beside the production machine. The product conveying device, or its outlet for discharging conveyed product mixture to the feed frame inlet of the production machine, may extend higher than the feed frame inlet of the production machine. In this case the feeding and dosing devices may be provided not higher than the product conveying device or its outlet.

According to a further embodiment, leading to a particular compact design, the feeding and dosing devices may form a feeding, dosing and mixing module together with the mixing device. The feeding, dosing and mixing module may be arranged in a module housing. This embodiment also allows for easily meeting containment requirements. Also, providing the feeding, dosing and mixing module allows for providing the module mobile, such that the feeding, dosing and mixing module can be moved from a production site to a different place, such as a different production site. The module housing may have the same height or a smaller height than a production machine housing.

According to a further embodiment, the module housing may form a system housing together with a housing of the production machine, for example a tablet press housing or a capsule filling machine housing. The module housing is thus integrated or connected with the production machine housing. This leads to a particular compact design, again allowing to easily meet containment requirements.

According to a further embodiment, a height difference between the outlet of the mixing device and the feed frame inlet of the production machine may be more than 0.50 m, preferably more than 1 m, more preferably more than 1.50 m. The product mixture may be conveyed with the product conveying device from the outlet of the mixing device to the feed frame inlet of the production machine over a height difference of more than 0.50 m, preferably more than 1 m, more preferably more than 1.50 m. The height difference corresponds to the vertical lift of the product mixture the product conveying device has to carry out. It may preferably be about 2 m.

According to a further embodiment, the overall height of the system may be less than 3.50 m, preferably less than 3 m, more preferably less than 2.50 m. The overall height denotes the height from the floor level the system is installed on up to the first and second inlets of the system. Such a small height of the system is made possible by the inventive system design and allows using standard rooms with improved accessibility of the system components.

According to a further embodiment, the product conveying device may be a pneumatic product conveying device, for example a vacuum dense phase product conveying device. Such a conveying device is particularly suited for the inventive purpose to convey the mixed powder material from the outlet of the mixing device to the feed frame inlet of the production machine without the occurrence of critical segregation. Segregation during conveying is generally caused because powder particles are different, mainly in particle size, particle shape and/or particle density. The first dry powder product may accordingly differ from the second dry powder product in particle size, particle shape and/or particle density. Granulation tries to solve segregation by effectively creating particles of the same size, shape and density, by bonding the different single ingredients together. However, depending on the production system it may not be desired to add a granulating device or it may be necessary to convey a powder mixture from a dry powder mixing device before entering a granulating device. The inventors of the current invention have found that in particular a vacuum dense phase product conveying device leads to sufficiently low segregation of the dry powder mixture during conveying.

In an embodiment, the product conveying device, for example vacuum dense phase product conveying device, may preferably comprise a hose for conveying the product mixture. Due to its simple, smooth inside geometry and large bend radii, a flexible hose allows for a flexible connection of the dry powder mixing device with the production machine, with minimal impact on the powder transport process and/or the transportation process control or requiring only small controls adjustments. A hose with dense powder under vacuum can also advantageously act as a buffer of upstream disturbances, on the downstream processes. Due to upstream disturbances, like a stop of refill systems, a stop of feeding and dosing devices, or a stop of the mixing device, components upstream of the hose can temporarily run empty. In such a case, the remaining powder in the hose will ensure that the production machine can continue to run normally. When powder flows again normally, due to the dense powder and the vacuum in the hose, the hose is filled up automatically with powder, without affecting the downstream processes.

According to a further embodiment, a ratio between the length of the hose and the diameter of the hose may be at least 25, preferably at least 50, more preferably at least 100. The hose thus has a relatively small diameter compared to its length. By using a small diameter hose, the friction on the powder in the hose is increased. This will in turn further deaerate and densify the powder in the hose, and which will aid with the formation in the hose of powder plugs, followed by air plugs. Powder plug formation, whereby the powder in the hose is formed into powder plugs followed by air plugs, is a phenomenon that occurs when the conveying hose pressure drop, or the vacuum level, is increased. The densification of the powder plugs will embed and lock the fine ingredient into the coarser ingredient matrix of the powder material and will further reduce air movement through the plug, during conveying. Particle-particle movement, in the powder plugs, and air through the powder plugs are further reduced, which further reduces segregation. Using a hose of sufficient length further allows for flexible positioning of the conveying unit and the production machine, thereby further reducing the footprint of the system and allowing the system to be placed in an even smaller room or placing individual components of the system in different rooms. In addition, with a system for continuous production of solid dosage forms, product tracking for lot genealogy and advanced process controls, is very important. Lot genealogy here means the concept of tracking every raw material batch up to the final dosage form so that the final dosage forms can be identified, recalled from the market if needed, and be disposed of, in the event an out-of-specifications raw material batch is identified. Advanced process controls here means the concept of combining different process measurements in time and space, of the same in-process product, to improve on process measurement and process understanding. Advanced process controls here can also mean using feed-forward or feed-backward control loops, where a process change or action on the product is done before or after the product is measured. To enable reliable product tracking, product back-mixing should be minimized or product first-in-first-out (FIFO) flow should be maximized, where possible. A small diameter hose further improves the FIFO product flow. Also, the conveying line pressure drop can be increased as desired, by decreasing the hose diameter or increasing the hose length.

As indicated, in an embodiment the product conveying device may be a vacuum dense phase product conveying device. The solids loading ratio of the pneumatic vacuum dense phase product conveying device may be more than 15, preferably more than 30, more preferably more than 60. The solids loading ratio is defined as the ratio of the mass flow rate of the solids conveyed to the mass flow rate of the air used. The inventors have found that such solids loading ratios are particularly advantageous in order to minimize segregation. The solids loading ratio may for example be measured at the outlet of the hose, thus at the higher end level of the hose. The outlet of the hose may directly or indirectly lead into the feed frame inlet of the production machine. For example, the hose may lead directly into a hose outlet hopper from where the powder mixture is transferred to the feed frame inlet of the production machine.

It is noted that the vacuum level in the conveying line of the vacuum dense phase product conveying device, for example a product conveying hose for conveying the product mixture, decreases over the length of the conveying line, with practically atmospheric pressure at the inlet of the conveying line and the highest vacuum at the outlet of the conveying line. According to a further embodiment the conveying line pressure drop of the pneumatic vacuum dense phase product conveying device, for example over the length of a hose for conveying the product mixture, may be more than 0.5 bar, preferably more than 0.7 bar, more preferably more than 0.9 bar. The absolute pressure at the outlet of the conveying line, for example a hose, may be less than 0.5 bar absolute, preferably less than 0.3 bar absolute, more preferably less than 0.1 bar absolute. Accordingly, a (very) deep vacuum is generated in the body of the vacuum dense phase product conveying device. Typically, in vacuum conveying, a small amount of air (by creating an opening to the environment to allow air being pulled in, or by adding some compressed air) is added to the powder stream, at the inlet of the conveying system to aid with powder plug formation and reduce the wall friction of the powder in the conveying line. By using a deep vacuum according to the above embodiment, powder plug conveying can be ensured, without extra aeration or compressed air. Without the extra air addition, powder is transported in plugs with minimal air movement through the plug. This in turn gives minimal particle-particle movement and minimal air through the powder, which effectively minimizes segregation.

According to a further embodiment, at the inlet of the product conveying device an inlet hopper may be provided wherein a preferably conical diameter reduction is provided towards the diameter of a conveying line, for example a product conveying hose, of the product conveying device. This deaerates and densities the powder material even further, so to embed & lock the fine ingredient into the coarser ingredient matrix and avoid air movement through the powder material, during conveying. Particle-particle movement and air through the powder are further reduced, which further reduces segregation.

As is known to the person skilled in the art, vacuum conveying may be an intermittent process. Intermittent vacuum conveying typically comprises the creating of a vacuum in the outlet of a conveying line, like a hose or pipe. The product is conveyed by the vacuum, through the conveying line. A discharge valve of the conveying line is opened to discharge the product from the outlet of the conveying line, the discharge valve is then closed, and the cycle repeats.

The vacuum product conveying line thus has a cycling frequency. In each cycle a certain powder portion is conveyed together through the product conveying device, having a certain cycle volume and mass. The powder portion conveyed in each cycle, through the vacuum product conveying line, can consist of one or more powder plugs.

By increasing the cycling frequency of the product conveying device, the cycling time is decreased and the conveying volume of the powder portion conveyed is decreased. Small conveying volumes will minimize the impact on the upstream and downstream processes. With regard to the upstream process, for example feeding and dosing devices, small powder volumes mean small powder level variation at the inlet of the product conveying device, and thereby small air pressure fluctuations on the outlet of the feeding and dosing devices. With regard to the downstream process, for example the feed frame of the production machine, small powder volumes mean small variation on powder level and powder pressure in the feed frame inlet, thereby minimizing variation on the feeding process of the production machine. According to a further embodiment the cycle mass may be no more than 2 kg, preferably no more than 1 kg, more preferably no more than 0.5 kg. The cycle mass can be calculated from the cycle time and the mass flow (the powder throughput of the system, in kg/h), as follows: cycle mass [kg]=cycle time [h]×mass flow [kg/h].

A fast cycling conveying device, with small conveying volumes allows the use of a small inlet and outlet hopper. An inlet and outlet hopper volume can be calculated from the cycle mass and the powder density. Because powder is poured into a hopper, this would be referred to as poured density: Hopper volume [litre]=cycle mass [kg]/powder density [kg/litre].

According to a further embodiment, an inlet hopper may be provided at the inlet of the product conveying device and/or an outlet hopper may be provided at the outlet of the product conveying device. The volume of the inlet hopper and/or the outlet hopper may be no more than 7 liters, preferably no more than 3 liters, more preferably no more than 0.5 liters, respectively. Minimizing buffers constituted by the inlet and outlet hoppers minimizes segregation by minimizing heap segregation, minimizing vibration segregation, minimizing shear segregation, and minimizing air segregation.

According to a further embodiment, at the inlet of the product conveying device an inlet hopper may be provided having an inlet hopper half angle of less than 45°, preferably no more than 30°, more preferably no more than 20°. The inlet hopper may for example have a conical shape. The hopper half angle is measured between a hopper wall, for example a conical hopper wall, and the hopper central axis line. Accordingly, the smaller the hopper half angle, the steeper the hopper half angle. A steep hopper half angle further minimizes heap and shear segregation by preventing rat-holing and promoting powder mass flow. Mass flow also improves the FIFO product flow. A steep hopper half angle leads to a small inlet diameter of the hopper for a given volume of the hopper. A small hopper inlet diameter can further minimize heap segregation.

According to a further embodiment, at the outlet of the product conveying device an outlet hopper may be provided wherein the ratio of height to diameter of the outlet hopper is at least 2, preferably at least 5, more preferably at least 10. The outlet hopper may preferably be cylindrical. Such a geometry further minimizes heap segregation.

In the outlet hopper a positive pressure may be applied, for example after opening a discharge of the outlet hopper. Using a small diameter and consequently a tall or long outlet hopper will increase the friction on the powder in the outlet hopper. The use of positive pressure in the outlet hopper can ensure the friction on the powder is overcome and the powder is discharged out of the outlet hopper.

Other conveying devices are generally also feasible, for example the conveying device may also be a powder pump, preferably a powder membrane pump or a pneumatic dilute phase product conveying device, or a screw conveyor device, for example a rigid or flexible screw conveyor device, or for example a bucket lift conveyor, a disk conveyor system, or a transport belt.

According to a further embodiment, the feed frame inlet may be provided with a vent opening, preferably with dust extraction, and more preferably with no filter. The product conveying device is intermittently feeding or discharging powder volumes into the inlet of the feed frame of the production machine. When the product conveying device's discharge valve is closed, the powder level in the inlet of the feed frame is decreasing or lowering. Because of the closed or air tight system, this would create an underpressure in the feed frame inlet and in the feed frame. This could have a negative effect on powder feeding into the production machine and could create undesired feeding fluctuations. To avoid this underpressure a vent opening is added on the feed frame inlet. Typically, an air filter (more specific: a particulate air filter, to filter out particulates from the air) is added to maintain containment and ensure no powder is escaping from the system. However, particle air filters have disadvantages of particular relevance here. On the one hand filters tend to have an accumulation of fine powder against the filter material. When this fine powder drops off the filter material again, it will cause a demixing or segregation of the fine powder. On the other hand, filters cause a pressure drop when air moves through the filter material. Filter clogging by powder increases this pressure drop further. This pressure drop over the filter will create an overpressure or an underpressure inside the system, depending on the direction of the air flow through the filter.

Therefore, it is particularly preferred to provide the open vent without a filter. To ensure that no powder escapes from the vent, the vent opening could comprise a (preferably vertical) venting tube of sufficient length and the actual vent opening at the top. The air volume of the venting tube may be at least the same size as the powder conveying volume. When a powder volume is charged into the feed frame inlet, air (possibly dusty air) is able to enter the venting tube, but essentially not exiting the venting tube into the surrounding environment. In the next step of the conveying cycle, the lowering powder level in the feed frame inlet will pull the (dusty) air back down in the venting tube. The air movement effectively follows the cycle of the product conveying device, with an amount of air rising (during powder discharge) and falling (when the blend conveyor outlet valve is closed) in the venting tube, but without the air actually escaping. As a safety feature, to ensure no dusty air or powder is escaping the venting tube, a dust extraction shroud or dust extraction nozzles (connected to a vacuum cleaner or centralized dust extraction system) may be installed above the venting tube, in particular above the vent opening. This would not be directly coupled with the venting tube, but positioned with a small gap above the venting tube. This shroud or nozzle will extract any dust that might escape the venting tube due to preferential air streams in the venting tube, entraining powder, or due to long-term transient effects.

An inlet hopper of the product conveying device may also be provided with a vent opening, preferably with no particle filter, as explained above for the feed frame inlet of the production machine. A similar intermittent, cyclic process like in the feed frame inlet, with a rising and falling powder level, exists in the inlet hopper of the product conveying device. The inlet hopper is continuously fed with powder by the dry powder mixing device and intermittently emptied by the product conveying device, effectively giving a (slow) rise and (fast) fall of powder in the inlet hopper. This could also create pressure variations in the mixing device and the outlets of the feeding and dosing devices. The open vent at the inlet hopper avoids pressure variations on the feeder outlet, a pressure increase during filling of the inlet hopper, and a pressure decrease during emptying of the inlet hopper.

Control of the mixing device, the product conveying device, the first and second inlets and/or potential feeding and dosing devices may be carried out through individual control units or a central control unit. For example, the mentioned components may be controlled by the same control unit as the production machine, for example a control unit of a tablet press or capsule filling machine. This makes control of the system particularly easy with the possibility of remote control from a separate room, thereby further improving operator safety.

The inventive method may be carried out with the inventive system. Accordingly, the inventive system may be designed to carry out the inventive method.

BRIEF DESCRIPTION OF THE DRAWINGS

Embodiments of the invention are explained in more detail below with reference to drawings. The drawings schematically show:

FIG. 3 1 illustrates a perspective view of another embodiment of a system for continuous processing of powdered products;

In the drawings the same reference numerals shall denote the same parts.

DETAILED DESCRIPTION OF THE INVENTION

Figure 1:
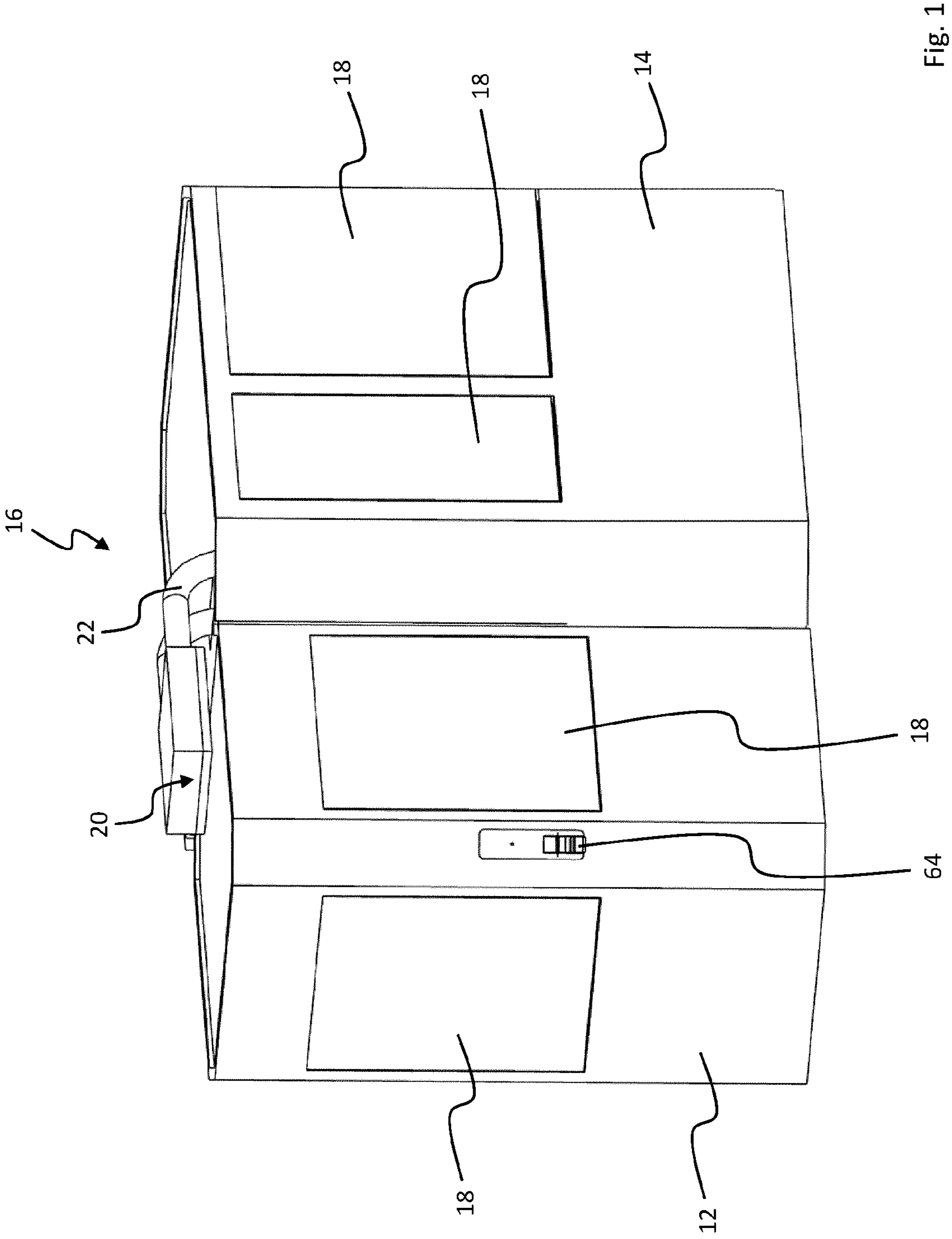
FIG. 1 illustrates a perspective view of an embodiment of a system for continuous processing of powdered products.
Figure 2:
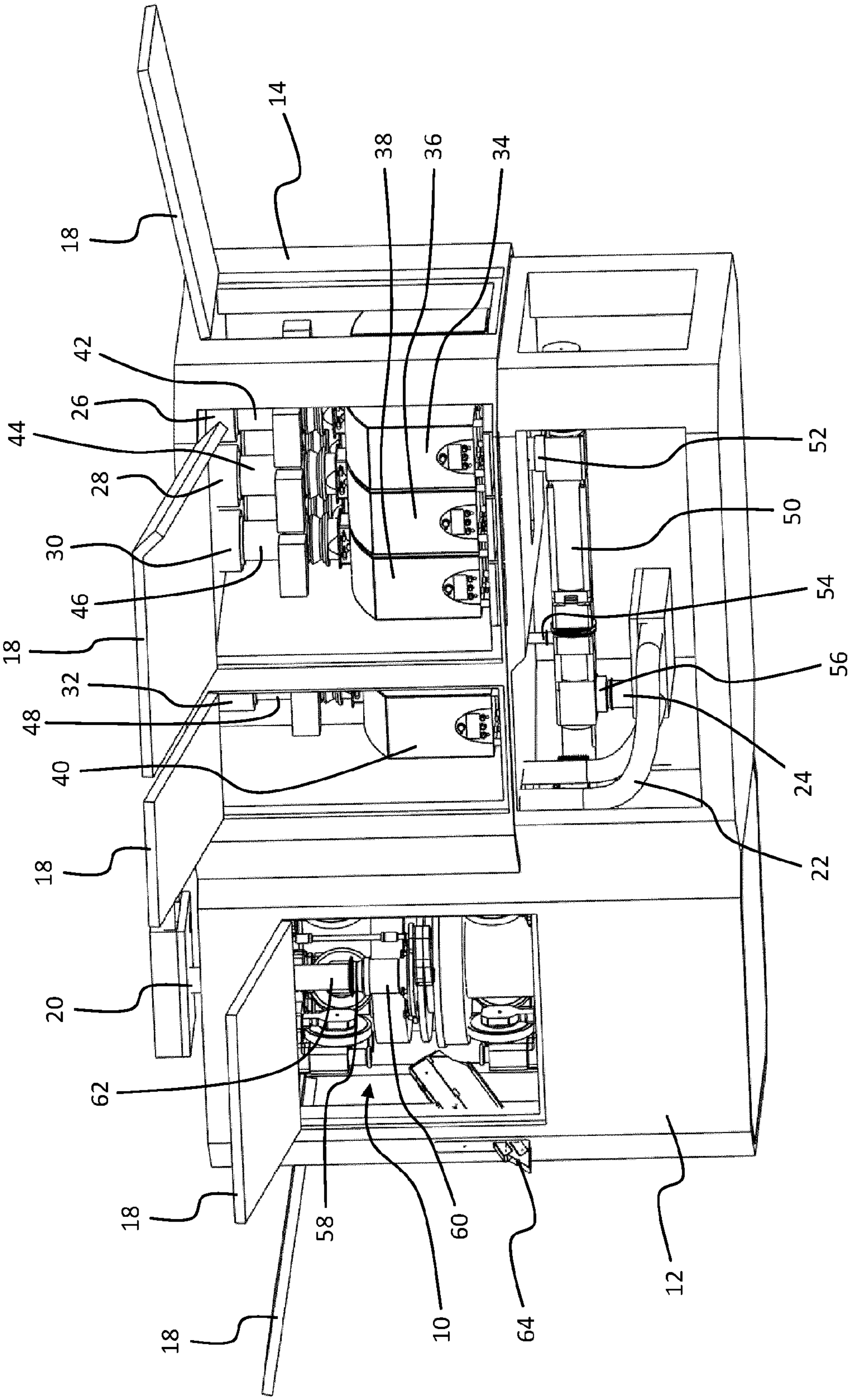
FIG. 2 illustrates another perspective view of the embodiment of FIG. 1.

FIGS. 1 and 2 show an inventive system for continuous production of solid dosage forms in direct processing according to a first embodiment. The system comprises a production machine 10, in the shown example a rotary tablet press 10. The tablet press 10 is arranged in a production machine housing 12, in the shown example a tablet press housing 12. The tablet press housing 12 is integrated with a module housing 14 which contains a feeding, dosing and mixing module explained in more detail in the following. The tablet press housing 12 forms a system housing 16 together with the module housing 14. The system housing 16 comprises a plurality of windows 18 which may be opened in order to access components of the system. While in FIG. 1, the windows 18 are shown in their closed position, in FIG. 2 the windows 18 are shown in their open position for better explanation of the system components. A lower part of the module housing 14 is further cut away in FIG. 2 for a better understanding of the system design. As can be seen for example in FIG. 1, the tablet press housing 12 and the module housing 14 have essentially the same height. At the top of the system housing 16 the outlet 20 of a product conveying device 22 of the system can be seen. The inlet of the product conveying device 22 can be seen in FIG. 2 at reference numeral 24.

In FIG. 2, a first inlet 26 for a first powder product, such as an API, and a second inlet 28 for a second powder product, such as an excipient, can be seen. Furthermore, a third inlet 30 for a third powder product and a fourth inlet 32 for a fourth powder product can be seen in FIG. 2. The third powder product may for example be a further API or a further excipient. The fourth powder product may for example be an excipient, such as a lubricant. Each of the inlets 26, 28, 30, 32 is connected with a subsequent feeding and dosing device 34, 36, 38, 40 through a refill system 42, 44, 46, 48. Each of the feeding and dosing devices 34, 36, 38, 40 may be a loss-in-weight feeder. As can be seen in FIG. 2 the feeding and dosing devices 34, 36, 38, 40 are arranged in a row, in particular along a horizontal axis.

The feeding and dosing devices 34, 36, 38 and 40 are on the other hand connected with a mixing device 50. The mixing device 50 may generally be any type of dry powder mixer or blender. Mixing device 50 has a first inlet 52 which is connected with the feeding and dosing devices 34, 36, 38. A second inlet 54 of the mixing device 50 is connected with the feeding and dosing device 40. The mixing device 50 further has an outlet 56 which is connected with the inlet 24 of the product conveying device 22. The outlet 20 of the product conveying device 22 is connected with a feed frame inlet 58 of a feed frame 60 of the tablet press 10. The outlet 20 of the product conveying device 22 and the feed frame inlet 58 of the feed frame 60 of the tablet press 10 are connected through a vertical tube 62. The tablet press 10 further has an outlet 64 for discharging produced tablets.

In the following the inventive method carried out with the inventive system will be explained. During production the first, second and third powder product, provided at the first, second and third inlet 26, 28 and 30 are continuously provided to the first inlet 52 of the mixing device 50 through the feeding and dosing devices 34, 36 and 38. The fourth powder product provided at the fourth inlet 32 is continuously provided to the second inlet 54 of the mixing device 50 through the feeding and dosing device 40. The mixing device 50 continuously produces and provides at its outlet 56 a powder product mixture of the four powder products. The product mixture is continuously fed to the inlet 24 of the product conveying device 22. As can be seen for example in FIG. 2 the inlet 24 of the product conveying device 22 is positioned below the outlet 56 of the mixing device 50 such that the product mixture can flow from the outlet 56 to the inlet 24 via gravity. As can further be seen in FIG. 2 the outlet 56 of the mixing device 50, and thus of course also the inlet 24 of the product conveying device 22, are arranged at a lower height than the feed frame inlet 58 of the tablet press 10, and also than the outlet 20 of the product conveying device 22, said outlet 20 being positioned above the feed frame inlet 58 of the tablet press 10. The product conveying device 22 continuously conveys the product mixture fed to its inlet 24 to its outlet 20, and thus vertically lifts the product mixture to a greater height. From the outlet 20 the lifted product mixture is fed continuously to the feed frame inlet 58 of the tablet press 10 via gravity, said tablet press 10 continuously producing tablets from the fed product mixture and discharging the produced tablets at its outlet 64.

According to the above explained system configuration, it is possible to restrict the overall height of the system to less than 3.50 m, preferably less than 3 m, more preferably less than 2.50 m. To this end the product mixture may be vertically lifted by the product conveying device 22 over a height of more than 1.50 m, for example roughly 2 m. It can be seen in FIGS. 1 and 2 that the system inlets 26, 28, 30 and 32, and thus also the feeding and dosing devices 34, 36, 38 and 40, are arranged such that they do not extend above the height of the product conveying device 22 with its outlet 20. The above explained system and method configuration allows for a particularly compact construction with simple installation and improved accessibility of the system components, as explained above.

Figure 3:
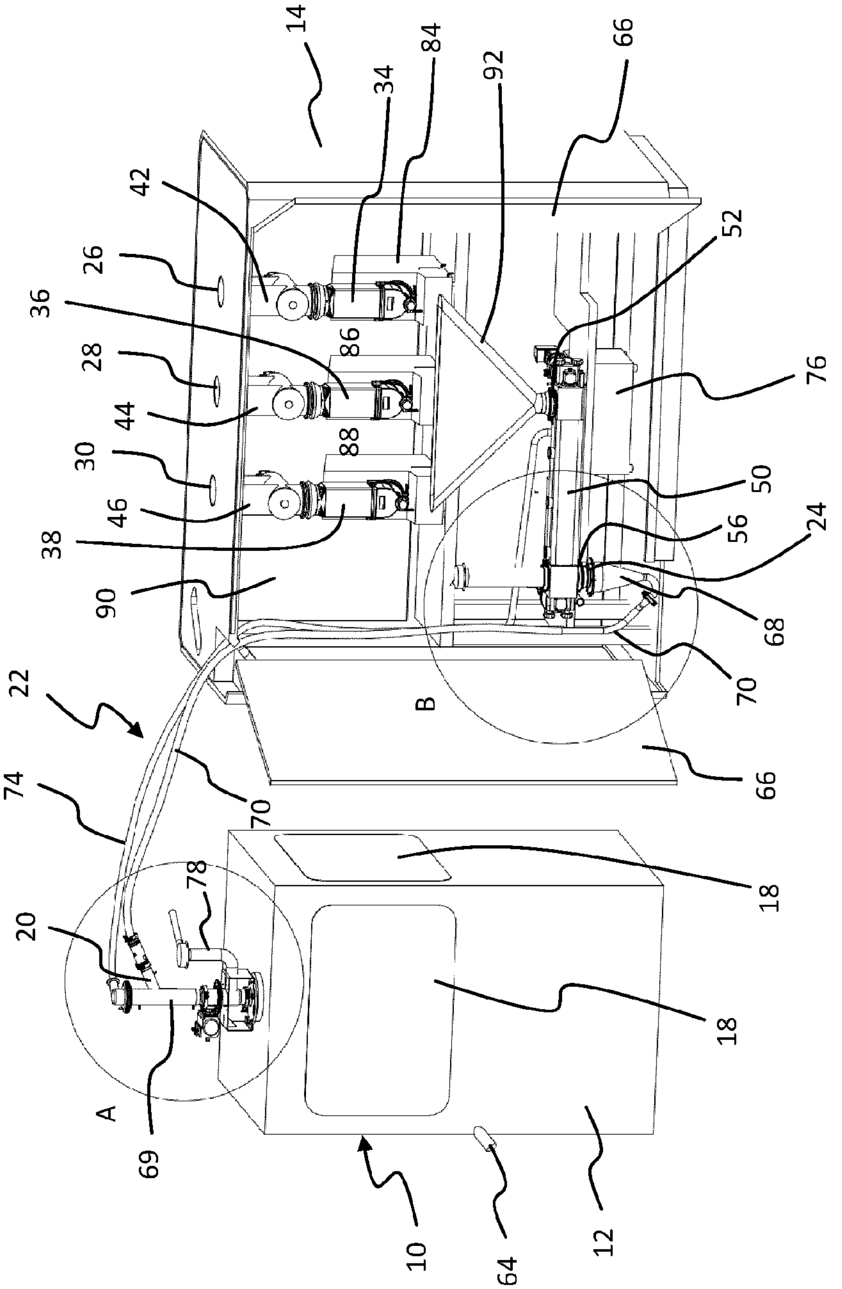
Figure 5:
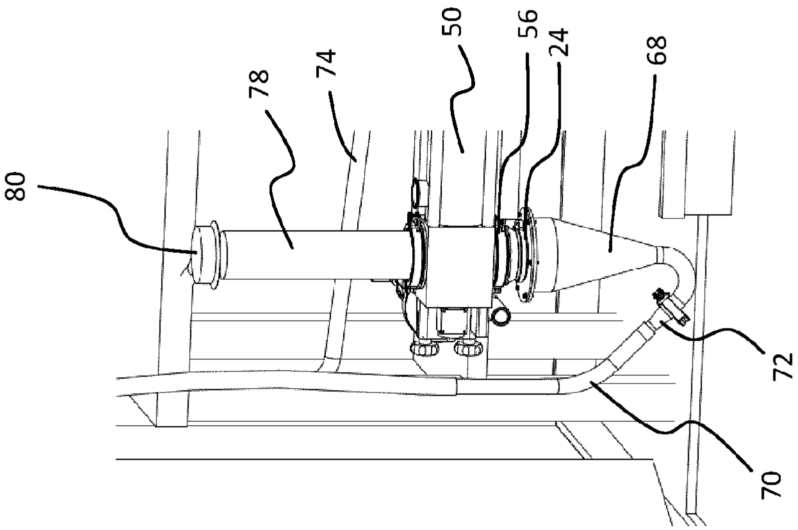
FIG. 5 illustrates an enlarged view of Detail B of FIG. 3.
Figure 4:
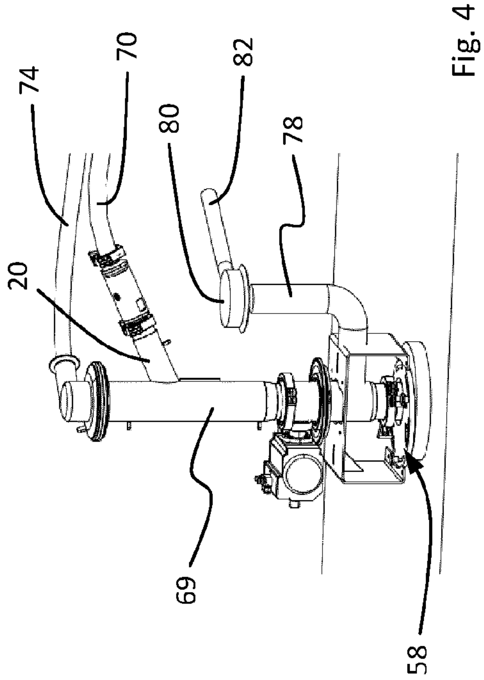
FIG. 4 illustrates an enlarged view of Detail A of FIG. 3.

In FIGS. 3 to 5, a second embodiment of an inventive system is shown which is widely similar to the system shown in FIGS. 1 and 2. It also comprises a feeding, dosing and mixing module arranged in a module housing 14 and a production machine 10 arranged in a production machine housing 12. The production machine 10 can for example also be a tablet press, such as a rotary tablet press. However, the production machine 10 could also be for example a capsule filling machine or another production machine.

In the embodiment shown in FIGS. 3 to 5 the module housing 14 comprises two doors 66 for access to the inside of the module housing 14, instead of windows 18 shown in FIGS. 1 and 2. In FIG. 3 the doors 66 are shown in the open position for better explanation of the system components. At the top of the production machine housing 12 the outlet 20 of a product conveying device 22 of the system can be seen. The inlet 24 of the product conveying device 22 can again be seen near the outlet 56 of the mixing device 50. At the inlet 24 of the product conveying device 22 an inlet hopper 68 of conical shape is arranged. Connected with the inlet hopper 68 of the product conveying device 22 is a flexible product conveying hose 70 for vacuum dense phase conveying of the product mixture exiting the mixing device 50. In the enlarged view of FIG. 5 a conical diameter reduction 72 of the inlet hopper 68 can be seen.

The vacuum dense phase product conveying device 22 shown in FIGS. 3 to 5 further comprises a flexible vacuum hose 74 and a vacuum generation device 76. The vacuum generation device 76 creates a vacuum at the outlet 20 of the product conveying hose 70 through vacuum hose 74 which leads to a conveying of product mixture through the product conveying hose 70 from the inlet 24 to the outlet 20 of the product conveying device 22. A discharge valve at the outlet 20 of the product conveying hose 70 is intermittently opened and closed to discharge the conveyed product mixture into the feed frame inlet 58 of the production machine 10. To this end an outlet hopper 69 is provided at the outlet 20 of the product conveying device 22.

This intermittent conveying process leads to an intermittent rising and lowering of powder level in the feed frame inlet 58 of the production machine 10, as explained above. In order to avoid an undesired underpressure in the feed frame inlet 58 a vertical venting tube 78 with a venting opening at its top, is provided at the feed frame inlet 58 of the production machine 10. At the top of the venting tube 78 a dust extraction shroud 80 and a dust extraction hose 82 is provided leading to a dust extraction system for extracting any powder dust potentially exiting the venting tube 78 through the venting opening.

Since a similar problem with regard to a rising and lowering pressure due to the intermittent conveying exists at the inlet hopper 68 of the product conveying device 22, a corresponding venting tube 78 with a venting opening at its top is arranged at the inlet hopper 68, as can be seen in FIG. 5.

For feeding dry powder product to the dry powder mixing device 50 the system shown in FIGS. 3 to 5 again comprises a first inlet 26 for a first powder product, such as an API, a second inlet 28 for a second powder product, such as in excipient, and a third inlet 30 for a third powder product. The third powder product may again for example be a further API or a further excipient. Each of the inlets 26, 28, 30 is again connected with a subsequent feeding and dosing device 34, 36, 38 through a refill system 42, 44, 46. Behind the feeding and dosing device 34, 36, 38 further technical components are arranged, such as drives, which are only partly shown in housings 84, 86, 88 in FIG. 3. The rear wall 90 of the module housing 14 can also be seen in FIG. 3.

The production process with the system shown in FIGS. 3 to 5 is essentially the same as explained above for FIGS. 1 and 2. Powder products are fed continuously through the inlets 26, 28, 30 via the refill systems 42, 44, 46 and the feeding and dosing devices 34, 36, 38 via a hopper 92 to the inlet 52 of the mixing device 50. The dry powder products fed to the mixing device 50 are continuously blended in the dry powder mixing device 50 and discharged through the outlet 56 of the mixing device 50 to the inlet 24 of the product conveying device 22, in particular the inlet hopper 68. The vacuum dense phase product conveying device 22 conveys the product mixture through the product conveying hose 70 to the feed frame inlet 58 of the production machine 10, as explained above. In the production machine 10 the product mixture is continuously processed to products, such as solid dosage forms, like tablets or capsules. The produced products are discharged from the production machine 10 through outlet 64.

Figure 6:
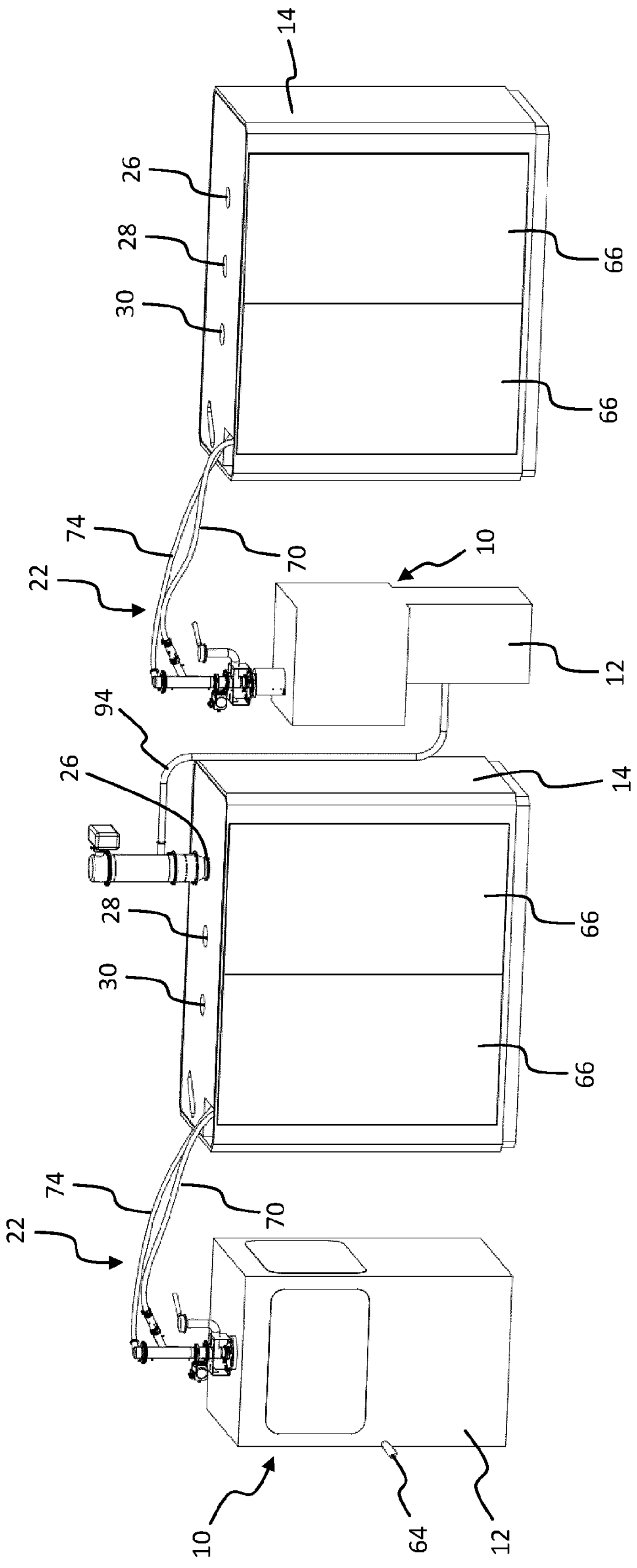
FIG. 6 illustrates a perspective view of another embodiment of a system for continuous processing of powdered products.

A further embodiment of an inventive system is shown in FIG. 6. The system shown in FIG. 6 comprises two feeding, dosing and mixing modules arranged in two module housings 14. The feeding, dosing and mixing modules with their module housings 14 may be embodied as explained for the system shown in FIGS. 3 to 5. In FIG. 6 the doors 66 of the module housings 14 are closed. A further difference between the system shown in FIG. 6 and the system shown in FIGS. 3 to 5 is that the system according to FIG. 6 comprises two production machines 10, each arranged in a production machine housing 12. The production machine 10 shown on the left side in FIG. 6 could for example be a tablet press, such as a rotary tablet press, or a capsule filling machine. The production machine 10 as shown between the two feeding, dosing and mixing modules could for example be a granulating device, such as a roller compactor or similar. In the first feeding, dosing and mixing module, shown on the right hand in FIG. 6, different dry powder products are continuously blended in a dry powder mixing device 50, as explained with regard to the above embodiments. The powder mixture is then conveyed through a product conveying hose 70 of the product conveying device 22 of the first feeding, dosing and mixing module, which again is a vacuum dense phase product conveying device, to the feed frame inlet of the subsequent first production machine 10, for example the granulating device. In this granulating device the product mixture is granulated to produce granule products. The granule products are then conveyed through a conventional granule conveying device 94, which could be any suitable granule conveying device, to one of the inlets 26 of the subsequent second feeding, dosing and mixing module. Further products may be entered into this second feeding, dosing and mixing module via the further inlets 28 and/or 30. The provided powder products, including the granule products, are then again continuously blended in the dry powder mixing device 50 of the second feeding, dosing and mixing module and subsequently conveyed through powder conveying hose 70 of the product conveying device 22 of the second feeding, dosing and mixing module, which again is a vacuum dense phase product conveying device, to the feed frame inlet of the second production machine 10, for example a tablet press or a capsule filling machine. In the second production machine 10 products are produced from the provided powder mixture, for example tablets or capsules, which are discharged via outlet 64.

Like the system shown in FIGS. 1 and 2 and in FIGS. 3 to 5 also the system shown in FIG. 6 operates continuous.

Furthermore, all systems shown in the drawings may be contained systems, for example with a containment level for product toxicity level OEB 3 or higher, measured for example according to the SMEPAC test.

LIST OF REFERENCE NUMERALS

10 production machine
12 production machine housing
14 module housing
16 system housing
18 windows
20 outlet of product conveying device
22 product conveying device
24 inlet of product conveying device
26 first inlet
28 second inlet
30 third inlet
32 fourth inlet
34, 36, 38, 40 feeding and dosing devices
42, 44, 46, 48 refill systems
50 mixing device
52 first inlet of mixing device
54 second inlet of mixing device
56 outlet of mixing device
58 feed frame inlet of production machine
60 feed frame of production machine
62 vertical tube
64 outlet of production machine
66 doors
68 inlet hopper
69 outlet hopper
70 product conveying hose
72 conical diameter reduction
74 vacuum hose
76 vacuum generation device
78 tube with vent opening
80 dust extraction shroud
82 dust extraction hose
84, 86, 88 housings for technical components
90 rear wall

The invention claimed is:

1. A system for continuous processing of powder products, the system comprising:
- a first inlet configured to input a first dry powder product;
- a second inlet configured to input a second dry powder product;
- a dry powder mixing device comprising:
- an inlet configured to connect to the first inlet to accept the first dry powder product and further configured to connect to the second inlet to accept the second dry powder product, wherein the dry powder mixing device is configured to mix the first dry powder product together with the second dry powder product to form a product mixture, and
- an outlet configured to dispense the product mixture from the dry powder mixing device;
- a production machine comprising a powder feed frame comprising:
- a feed frame inlet connected to the outlet of the dry powder mixing device, wherein the outlet of the dry powder mixing device is positioned at a lower level than the feed frame inlet of the production machine, and
- a feed frame outlet; and
- a product conveying device connected between the outlet of the dry powder mixing device and the feed frame inlet of the production machine and comprising a product conveying hose comprising a length and a diameter and configured to convey the product mixture, wherein the product conveying device is configured to continuously convey the product mixture from the outlet of the dry powder mixing device to the feed frame inlet of the production machine, wherein a ratio between the length of the product conveying hose and the diameter of the product conveying hose is at least 25.

2. The system according to claim 1, wherein the continuous processing of the powder products comprises a continuous production of solid dosage forms in direct processing, wherein the production machine is configured to continuously produce the solid dosage forms from the product mixture, and wherein the production machine further comprises an outlet for discharging the solid dosage forms.

3. The system according to claim 2, wherein the production machine is one of: (1) a tablet press; (2) a capsule filling machine; and (3) a granulation device.

4. The system according to claim 1, wherein the first inlet for the first dry powder product and the second inlet for the second dry powder product are arranged at a height level that is at least one of: (1) a same height level; and (2) a lower height level than one of: (a) the production machine; and (b) the product conveying device.

5. The system according to claim 1, wherein a height difference between the outlet of the dry powder mixing device and the feed frame inlet of the production machine is more than 1.50 m, and wherein an overall height of the system is less than 2.50 m.

6. The system according to claim 1, wherein the product conveying device is a pneumatic vacuum dense phase product conveying device, wherein a conveying line pressure drop of the pneumatic vacuum dense phase product conveying device is more than 0.5 bar, and wherein a cycle mass of the pneumatic vacuum dense phase product conveying device is no more than 2 kg in weight.

7. The system according to claim 6, wherein solids loading ratio of the pneumatic vacuum dense phase product conveying device is more than 15.

8. The system according to claim 1, further comprising, an inlet hopper positioned at the inlet of the product conveying device, and a conical diameter reduction configured to reduce a diameter from the inlet hopper to a conveying line of the product conveying device.

9. The system according to claim 1, further comprising at least one of: (1) an inlet hopper positioned at the inlet of the product conveying device; and (2) an outlet hopper positioned at the outlet of the product conveying device, wherein a volume of either the inlet or the outlet hopper is no more than 0.5 liters in volume.

10. The system according to claim 1, further comprising an outlet hopper positioned at the outlet of the product conveying device, wherein a ratio of a height of the outlet hopper to a diameter of the outlet hopper is at least 2.

11. The system according to claim 10, wherein a positive pressure is applied in the outlet hopper.

12. The system according to claim 1, wherein the feed frame inlet comprises a vent opening.

13. The system according to claim 1, further comprising an inlet hopper of the product conveying device, wherein the inlet hopper comprises a vent opening.

14. The system according to claim 13, wherein the vent opening comprises a venting tube.

15. The system according to claim 1, further comprising a plurality of feeding and dosing devices, wherein each of the first inlet, the second inlet, and the inlet of the dry powder mixing device is connected to one of the plurality of feeding and dosing devices.

16. The system according to claim 15, wherein the plurality of feeding and dosing devices, and the dry powder mixing device comprise a feeding, dosing and mixing module, wherein the feeding, dosing and mixing module is arranged in a module housing.

* * * * *